US009534716B2

(12) United States Patent
Randrianarivony et al.

(10) Patent No.: US 9,534,716 B2
(45) Date of Patent: Jan. 3, 2017

(54) STRUCTURAL CONNECTOR DIVERTING LOADS AWAY FROM THE COOL CONNECTOR

(75) Inventors: Liva Christian Randrianarivony, Eze bord de Mer (FR); Laurent Le Touze, Nice (FR)

(73) Assignee: SINGLE BUOY MOORINGS INC., Marly (CH)

( * ) Notice: Subject to any disclaimer, the term of this patent is extended or adjusted under 35 U.S.C. 154(b) by 934 days.

(21) Appl. No.: 13/393,712

(22) PCT Filed: Sep. 3, 2010

(86) PCT No.: PCT/EP2010/062984
§ 371 (c)(1),
(2), (4) Date: Mar. 1, 2012

(87) PCT Pub. No.: WO2011/026951
PCT Pub. Date: Mar. 10, 2011

(65) Prior Publication Data
US 2012/0161052 A1  Jun. 28, 2012

(30) Foreign Application Priority Data

Sep. 3, 2009 (EP) .................................... 09169378
May 12, 2010 (EP) .................................... 10162646

(51) Int. Cl.
*F16L 37/36* (2006.01)
*F16L 29/00* (2006.01)
(Continued)

(52) U.S. Cl.
CPC .............. *F16L 29/007* (2013.01); *B63B 27/24* (2013.01); *F16L 37/002* (2013.01); *F16L 37/62* (2013.01)

(58) Field of Classification Search
CPC ......... B63B 27/24; F16L 37/62; F16L 37/002; F16L 29/007; Y10T 137/87925; Y10T 137/87933; Y10T 137/87973; Y10T 137/8807; Y10T 137/0441; Y10T 137/0447
(Continued)

(56) References Cited

U.S. PATENT DOCUMENTS 2,946,605 A * 7/1960 Mosher .................... 137/614.03
3,442,535 A * 5/1969 Frohlich ............. F16L 37/1205
24/24
(Continued)

FOREIGN PATENT DOCUMENTS

EP  1710206 A1  10/2006
EP  2374711 A1 * 10/2011
(Continued)

OTHER PUBLICATIONS

International Search Report, dated Feb. 1, 2011, from corresponding PCT application.

*Primary Examiner* — Craig J Price
(74) *Attorney, Agent, or Firm* — Young & Thompson

(57) ABSTRACT

Connector for releasably attaching two fluid transfer lines, includes a flow connector with a first and second connector assemblies (3, 6) each having a fluid passage, a valve rotatably seated in the passage for opening or closing off the fluid passage. The flow connector also including a normal connection/disconnection system and an emergency disconnection system both located at the same interface and each one having its own dedicated actuating system characterized in that the flow connector is combined with a structural disconnectable load diverter (11, 4, 59) diverting the loads and moments created by the transfer line (2) away from the valves and the flow connector.

2 Claims, 16 Drawing Sheets

(51) Int. Cl.
  *B63B 27/24* (2006.01)
  *F16L 37/00* (2006.01)
  *F16L 37/62* (2006.01)

(58) Field of Classification Search
  USPC ........ 137/614, 614.01, 614.06, 15.08, 15.09,
         137/615; 285/409, 904, 18, 320, 364,
         285/920; 62/50.7; 114/230.1, 230.12,
         114/230.13, 230.15; 141/382, 387;
         166/332.3; 441/4, 5; 251/149.9
  See application file for complete search history.

(56) References Cited

U.S. PATENT DOCUMENTS

| | | | |
|---|---|---|---|
| 3,661,408 A * | 5/1972 | Gibbons | F16L 37/1205 285/18 |
| 3,865,409 A * | 2/1975 | Paddington | F16L 37/1205 285/18 |
| 3,865,412 A * | 2/1975 | Ashton | F16L 37/1205 285/24 |
| 4,202,567 A * | 5/1980 | Paddington | F16L 37/1205 285/18 |
| 4,222,591 A * | 9/1980 | Haley | F16L 37/1205 285/18 |
| 4,306,739 A * | 12/1981 | Bormioli | 285/18 |
| 4,309,049 A * | 1/1982 | Chevallier | 285/18 |
| 4,354,522 A * | 10/1982 | Bormioli | 137/614.02 |
| 4,459,930 A * | 7/1984 | Flory | 141/387 |
| 4,515,182 A * | 5/1985 | LeDevehat | 137/614.06 |
| 4,519,411 A * | 5/1985 | Takahashi | 137/614 |
| 4,622,997 A * | 11/1986 | Paddington | 137/614.06 |
| 5,507,313 A * | 4/1996 | LeDevehat | 137/614.06 |
| 5,529,521 A | 6/1996 | Breivik et al. | |
| 5,893,333 A * | 4/1999 | Smedal | B63B 22/026 114/230.2 |
| 6,056,011 A * | 5/2000 | Bormioli | 137/614.06 |
| 7,147,022 B2 * | 12/2006 | Le Devehat | 141/387 |
| 7,219,694 B2 * | 5/2007 | Bormioli | 137/614 |
| 7,510,452 B2 * | 3/2009 | Van Tol | B63B 21/508 441/5 |
| 7,699,359 B2 * | 4/2010 | Le Devehat | F16L 37/1205 285/364 |
| 8,296,914 B2 * | 10/2012 | Dupont | B63B 27/24 141/231 |
| 8,397,655 B2 * | 3/2013 | Braud | B63B 21/508 114/230.12 |
| 2004/0024484 A1 | 2/2004 | Bahlmann et al. | |
| 2006/0130909 A1 * | 6/2006 | Bormioli | 137/614 |
| 2009/0071173 A1 * | 3/2009 | Eide | F17C 6/00 62/50.7 |
| 2011/0277845 A1 * | 11/2011 | Le Devehat et al. | 137/1 |
| 2012/0133122 A1 * | 5/2012 | Hovik et al. | 285/27 |
| 2015/0034002 A1 * | 2/2015 | Bauduin | B63B 21/508 114/230.12 |

FOREIGN PATENT DOCUMENTS

| | | |
|---|---|---|
| FR | 2966553 A1 * | 4/2012 |
| GB | 2 451 743 A | 2/2009 |
| WO | 93-11034 | 6/1993 |
| WO | 93/24731 A1 | 12/1993 |
| WO | 2007/063050 A1 | 6/2007 |
| WO | 2009/071591 A2 | 6/2009 |

* cited by examiner

ERS closed

ERS mid stroke 1

ERS mid stroke 2

ERS open

Rearm step 1
Open the QCDC

Rearm step 2
QCDC Opened

Rearm step 3
Close the ERS

Clamp ready for service

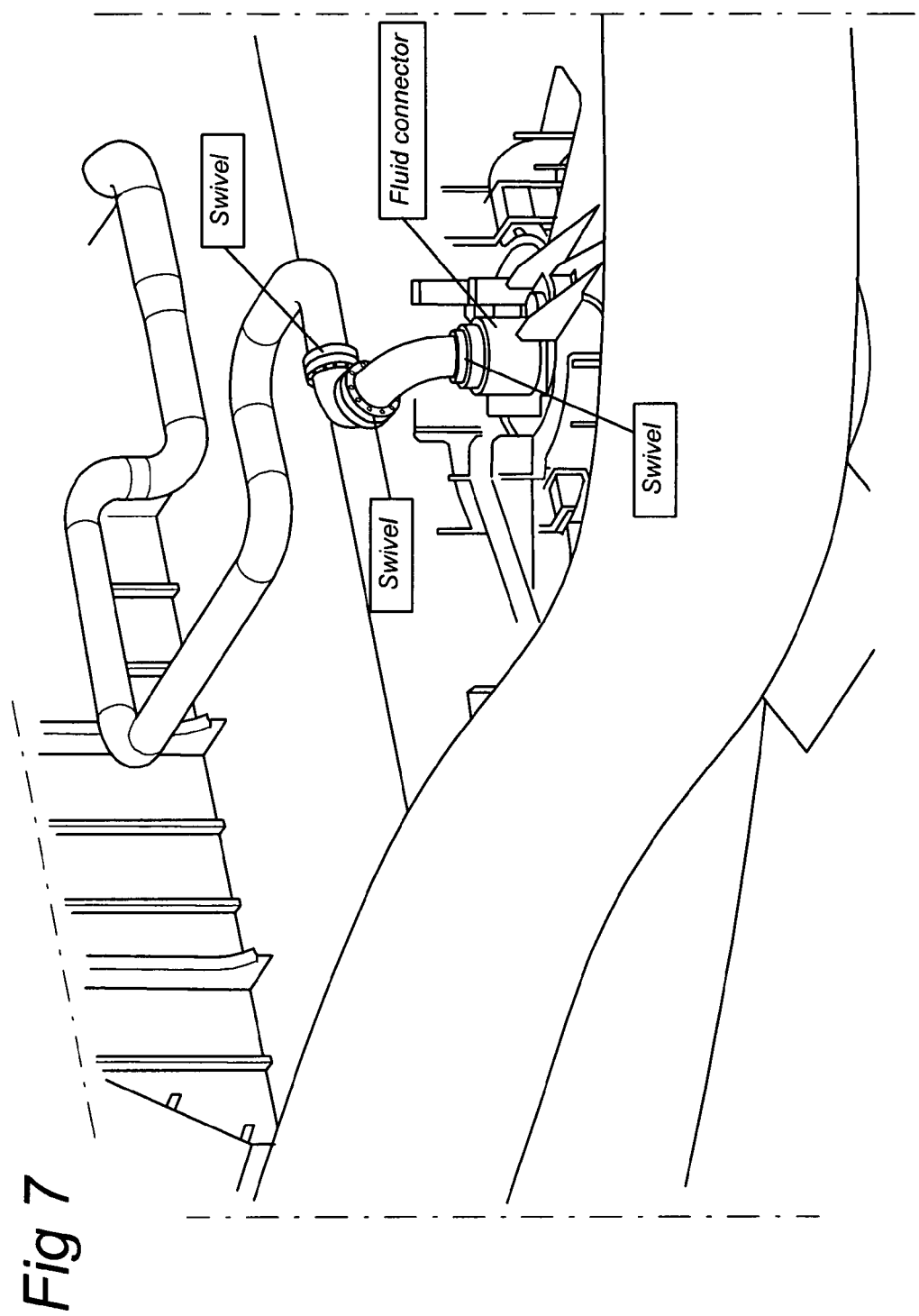

STRUCTURAL CONNECTOR DIVERTING LOADS AWAY FROM THE COOL CONNECTOR

FIELD OF THE INVENTION

The invention relates to a connector for releasably attaching two fluid transfer lines, comprising a flow connector where a first and second connector assemblies each having a fluid passage, a valve rotatably seated in the passage for opening or closing off the fluid passage, the flow connector also comprising a normal connection/disconnection system and an emergency disconnection system both located at the same interface and each one having its own dedicated actuating system.

Further in the text when referring to a "merged" emergency and normal connection/disconnection means it is to refer to the fact that the normal connection/disconnection system and emergency disconnection system are using separated actuators and mechanisms but are located at the same piping interface. A clamp support is supporting both systems but each system at its own location on the same interface.

BACKGROUND OF THE INVENTION

Such a connector is known from the international patent application WO2009/071591 filed by the applicant, where there is provided a multi purpose connection system by integrating a Quick Connect Disconnect Coupling (QC/DC) suitable for normal operations, an Emergency Release Coupling (ERC) for controlled emergency disconnections and, alternatively a Break Away Coupling (BAC) for uncontrolled emergency scenarios. The QC/DC activation mechanism may be power-operated both ways, open and closed. The activation of the ERC mechanism is done via a "triggering device" which releases stored energy and can break ice formed thereon. By having a passive release system, disconnection is possible even in case of a power failure. In this way, upon emergency disconnection, hazardous fluids will not be lost. This is especially important in case of transfer of liquefied natural gas (LNG) for instance between a loading and unloading terminal and a shuttle tanker.

In the US patent application no. 2004/0244846, an arrangement for connection and disconnection of two end sections of pipelines for transfer of liquefied natural gas is shown. The known arrangement comprises a butterfly valve with a circular disk mounted inside the pipe sections and with articulated arms, driven by a shaft that is rotated by means of a rotating drive member on the outer perimeter of the valve housing. The pipe segments are interconnected via a two ring segments that can be moved apart in a radial direction in case of an emergency disconnection. In case of disconnection, the ring segments remain attached to one of the pipe sections.

In EP1710206 there is disclosed a guide for the free end of the pipe which leads it into the receptacle end of the pipe on the connection unit. This comprises a guide peg entering a cone providing location as connection is approached. This specially developed targeting system enables the safe connection and disconnection of the arms to the LNG carrier's manifold in dynamic conditions caused by wave-induced motions. A winch is provided on the connection unit which can reduce the load applied on the connector.

However, with such a design, the peg is not locked into the cone and hence, from time to time, the valves of the connector are taking on the loads such as the bending loads, the shear loads and the axial loads due to the movement of each vessel, the environment etc. . . .

The connector according to the present invention provides a fluid flow connector combined with a structural load diverter comprising a load bearing structure and a synchronized locking mechanism. Therefore, the present invention avoids a situation where the structural load diverter gets unlocked while the fluid connector is still locked. The connector according to the present invention has a compact design and ensures a safe connection and disconnection, avoiding the valves to be subjected to loads they are not designed for.

A further advantage of the connector according to the present invention is that it is reusable and can be tested in situ after connection. The emergency disconnection system can be rearmed without external action.

Another advantage of the present invention is that the transfer line end part assembly of the connector and the carrier end part assembly of the connector both have a conical shape for a cone-in-cone connection for which no particular orientation is hence required. The connection is facilitated.

SUMMARY OF THE INVENTION

The object of the present invention is to provide a connector for releasably attaching two fluid transfer lines, comprising a flow connector where a first and second connector assemblies each having a fluid passage, a valve rotatably seated in the passage for opening or closing off the fluid passage, the flow connector also comprising a normal connection/disconnection system and an emergency disconnection system both located at the same interface and each one having its own dedicated actuating system with the flow connector being combined with a structural disconnectable load diverter diverting the loads and moments created by the transfer line, away from the valves and the flow connector and the structural disconnectable load diverter comprising a normal connection/disconnection system and an emergency disconnection system. A possible normal connection/disconnection system of the structural load diverter could be a quick coupling decoupling system (QC/DC) jack system and a possible emergency disconnection system of the structural load diverter could be an Emergency Release System (ERS) jack system.

It is a further object of the present invention to provide a connector where the normal connection/disconnection system operations are synchronized with the connection/disconnection of the structural load diverter. Further, according to the present invention the emergency disconnection system operation is synchronized with the disconnection of the structural load diverter, the activation of the normal connection/disconnection means of the flow connector activating the normal connection/disconnection means of the structural load diverter and the activation of the emergency disconnection means of the flow connector activates the emergency disconnection means of the structural load diverter.

The connector according to the present invention comprises a first and a second connector assemblies, the first member or transfer line end part assembly comprising a valve assembly, a valve actuating system and a structural load diverter, the second member or carrier end part assembly comprising a valve assembly, a valve actuating system, an emergency and normal connection/disconnection means for the flow connector and an emergency and normal connection/disconnection means for the structural load diverter.

The flow connector operations are synchronized to the structural load diverter operations via an interlock that can be of any type such as mechanically activated interlock, hydraulically activated interlock or an interlock operated by a computer and any combination of the pre-cited type of interlocks . . . .

According to the present invention, the transfer line end part assembly is provided with buoyancy means and comprises a containment draining system that can also have some buoyancy integrated.

It is a further object of the present invention to provide a connector provided with an adjusting system accommodating displacements generated by the structural connector tolerances that could be a combination of three swivels in the piping at the bow of the carrier or a compliant spool piece comprising components accommodating axial and angular misalignments An additional object of the present invention is a compliant spool piece designed to connect two piping components in a fluid transfer system which also provides loads decoupling characteristics. In this spool piece, a piston seal system is used to accommodate for axial misalignment and a combined sphere and seat seal are used to accommodate for angular misalignment.

Another object of the present invention is a method to disconnect the connector in normal conditions as well as in emergency conditions. The present invention includes procedures for connecting such a connector.

Therefore, the structural connector is designed with the following synchronization principle:

For the connection: as the winch is paying in, the structural connector is engaged and locked. The winch is still holding the transfer line member part of the connector against its carrier member part when the "merged" emergency and normal connection/disconnection means clamp support of the fluid connector is closing until the clamp support is completely locked. At this stage, the fluid connector is locked and the structural load diverter is secured, the winch can be released.

During the lifting operations the piping has to clear the lifting path to enable the winch to lift the connector at its offloading position. This constraint implicates the use of cryogenic swivels in the offloading lines to remove the connector from the lifting path.

For a normal disconnection: the fluid connector being locked and the structural load diverter being secured, the winch is re-installed and it holds back the transfer line part of the connector against its carrier member part. Then the "merged" emergency and normal connection/disconnection means clamp support opening means of the fluid connector is actuated, the fluid connector opens and the structural load diverter is still locked but not secured. When the "merged" emergency and normal connection/disconnection means clamp support is clear from the hub (where the valves are located), then the "merged" emergency and normal connection/disconnection means clamp support opening means of the fluid connector activates the release of the structural load diverter. The winch pays out and the transfer line end part of the connector is disconnected.

For emergency disconnection: the fluid connector is locked, the structural load diverter is locked and the winch is disconnected when an emergency disconnection is initiated. The valve actuating system (VAS) will close the Emergency Release System (ERS) valves in a first stroke and release the emergency disconnection system (cam system of the "merged" emergency and normal connection/disconnection means of the fluid connector) in a second stroke. The "merged" emergency and normal connection/disconnection means of the fluid connector being energized its clamp support opening initiates the emergency disconnection of the structural load diverter. The transfer line end part of the connector is then disconnected.

Another advantage of the present invention is that the connector can adapt to all environments, to all diameter size of transfer lines and to very low temperatures (even cryogenic temperatures). The connector according to the present invention is adapted to connect a transfer line between a production unit and a carrier transferring fluids such as hydrocarbons, liquefied gas such as liquefied $CO_2$, but it is also adapted to connect a cryogenic transfer line for the transfer of cryogenic fluids such as LNG etc. . . .

BRIEF DESCRIPTION OF THE DRAWINGS

The invention will be further described below in connection with exemplary embodiments with reference to the accompanying drawings, wherein

FIG. 7 shows an arrangement of a combination of three swivels in order to accommodate the displacements generated by the structural connector tolerances.

FIG. 1 shows a schematic split between the structural connector and the fluid connector of a connector according to the present invention. It is clearly shown that the connector 1 is composed of one fluid connector and one structural connector.

The fluid connector is to transmit fluids and gases. It is of a known type comprising isolation valves to let or prevent fluids or gases to pass, with the fixed pipe section comprising a valve assembly and the mobile pipe section comprising the other valve assembly. The fluid connector is also provided with a normal connection/disconnection device and an emergency disconnection device making it possible, in an extreme situation to distance the mobile pipe section from the fixed pipe section in order to prevent damage to the structure. A possible type of fluid connector according to the present invention is provided with a quick coupling decoupling system (QC/DC) as normal connection/disconnection system and a Powered Emergency Release Coupler (PERC) as emergency disconnection system.

Figure 1:
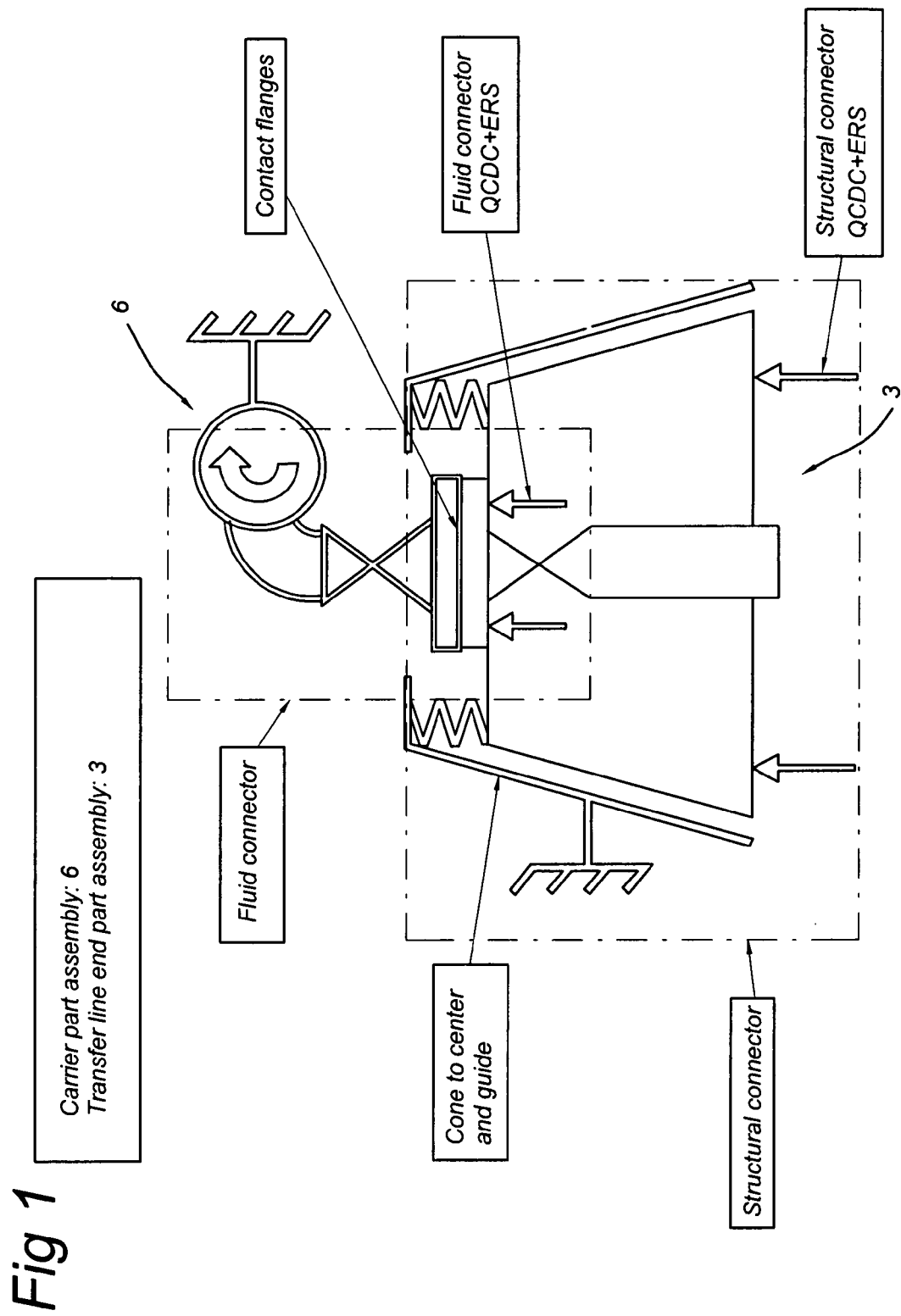
FIG. 1 shows a schematic split between the structural and the fluid connector of a connector according to the present invention

The structural connector is to transmit loads from the hose export line while providing normal connection/disconnection and emergency disconnection functionalities. It also appears clearly from FIG. 1 that the fluid and the structural connector are mechanically linked together and they have both normal connection/disconnection and emergency disconnection functionalities. These normal connection/disconnection and emergency disconnection functionalities of both connectors are interlocked. In this way the fluid flow connector members operations can be synchronized to the structural connector members operations. The interlock synchronizing both connectors operations can be mechanically operated, hydraulically operated or operated by a computer. In the embodiment shown in FIG. 1 the normal connection/disconnection and emergency disconnection functionalities of both connectors are interlocked and activated in a predetermined sequence using a programmable logic controller system (PLC).

Figure 2:
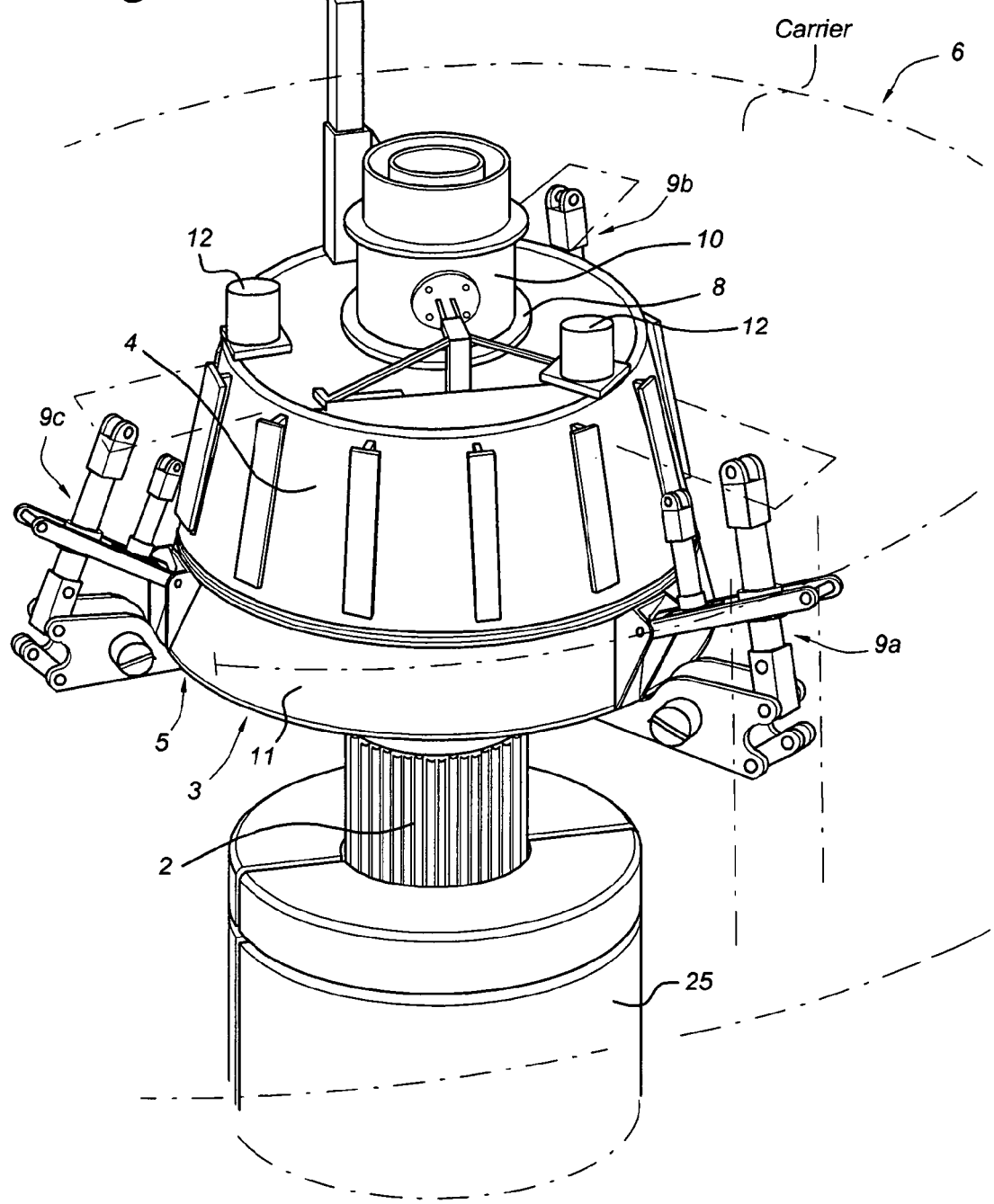
FIG. 2 shows one preferred embodiment of the connector according to the present invention when in connection.

FIG. 2 shows one preferred embodiment of the connector when in connection. According to the present invention, the connector 1 for releasably attaching a fluid transfer line 2 to a carrier comprises a first and second connector sub assemblies 3, 6. The first subassembly or transfer line end part assembly 3 is linked to the transfer line 2 and comprises a conical male structure comprising a top structural part 4 and a structural load diverter 11. The conical male structure is also provided with an integrated independent fluid path (FIG. 3b) comprising a valve assembly and a valve actuating system (not shown).

The second subassembly or carrier part assembly 6 is linked to the carrier and comprises clamps 9a, 9b and 9c, a valve assembly 10, a valve actuating system 7, the fluid connector normal connection/disconnection device and emergency disconnection device which are in the embodiment shown in the form of a "merged" Powered Emergency Release Coupler (PERC) and Quick Connect/Disconnect Coupler (QC/DC) with a clamp support 8. The clamps 9a, 9b and 9c located on the carrier are used to secure the structural connector at the carrier bow loading station during offloading operations.

Figure 3A:
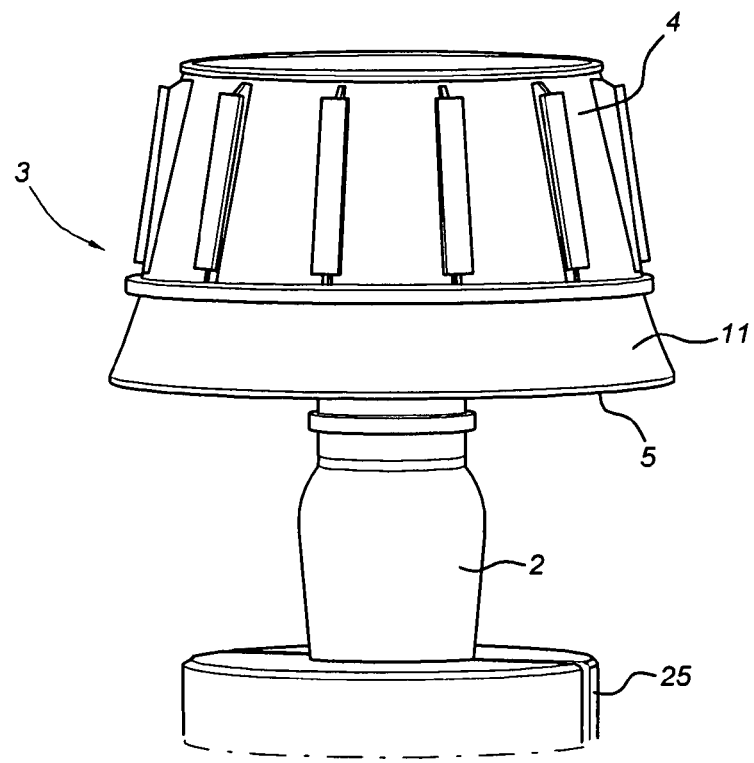
FIGS. 3a and 3b show the transfer line end part member of the connector of FIG. 1.
Figure 3B:
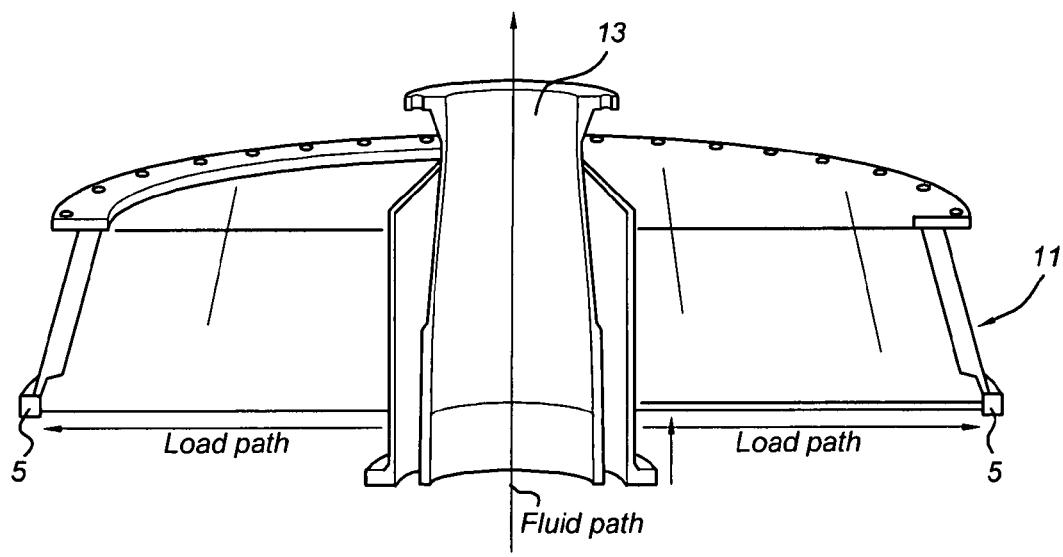

In this particular embodiment, as better shown in FIGS. 3a and 3b the conical structure is constructed in two pieces, the top structural part 4 which purpose is to guide the system and to be in contact with the stoppers 12 and a transition piece or structural load diverter 11 that transmits loads and accommodate a central fluid path 13. The structural connector is mainly made of standard stainless steel plates. The main purpose of the structural connector is to divert loads coming from the suspended hose directly into the dedicated carrier's bow manifold, thereby avoiding transferring any load to the fluid connector system. The transition piece 11 is the common link for the fluid transmission and the load transmission, it transmits, from the transfer line 2, loads to the normal connection/disconnection system (or QCDC clamps) of the structural connector and fluid to the fluid connector.

In case of a valve failure there might be some spilled fluid. The transition piece 11 is also provided with a containment part used to drain spilled fluid away from the structure especially cryogenic fluids that could damage the deck. The deck will in addition be provided with inclined insulating protection systems made of polymer such as SPS (Sandwich Plate System) that will direct spilled fluid towards the connector and hence towards the containment draining system incorporated in it and protect the coating of the deck. Ideally the containment draining system is also provided with integrated buoyancy parts.

Once assembled, the transition piece 11 and the top structure 4 form a structure that is clamped between the normal connection/disconnection mechanism 9a, 9b and 9c and the stoppers 12 (as shown in FIG. 2) which are mounted on the LNG carrier bow loading station. The vertical positioning of the transfer line end part assembly 3 is determined by the clamps 9a, 9b and 9c in closed position and the pre-tension is done by compressing the elastomeric pads (not shown) of the stoppers 12. The stoppers are so called passive pre-tensioning systems. The construction is similar to a spring with a guiding system. A sliding part is in contact with the top part of the structural connector, while sliding this part can compress an elastomeric pad. When the normal connection/disconnection system is activated the elastomeric pad is being compressed, the structural connector is then clamped and pretensioned between the normal connection/disconnection clamps 9a, 9b and 9c and the stoppers 12.

As shown in FIGS. 4a to 4c and 5a to 5d, each clamp 9a, 9b and 9c has normal connection/disconnection and emergency disconnection functionalities. The clamp is designed to finalize the positioning of the structural connector into the receptacle on the carrier bow manifold structure by applying some pretension loads. It is also designed to resist the combination of the hose loads and the pretension loads.

This system is hydraulically actuated. The hydraulic system drives normal connection/disconnection and emergency disconnection functions. The system does not rely on positive hydraulic pressure to keep the clamp closed during fluid transfer (fail safe system).

Figure 4A:
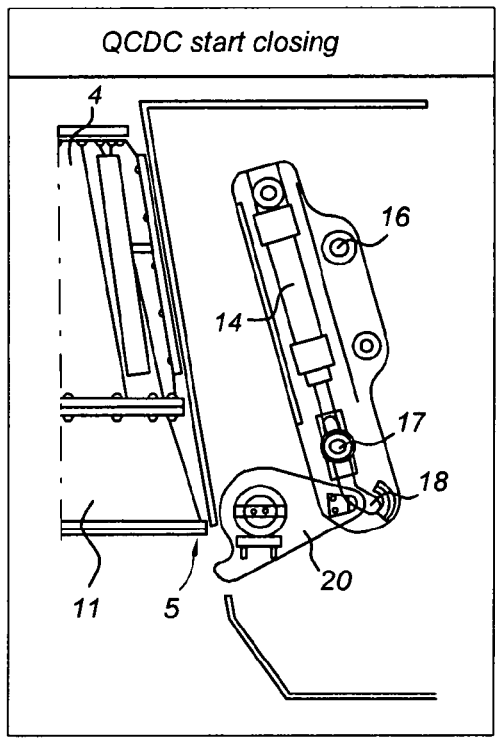
FIG. 4a to 4c show detailed views of one embodiment of the fastening and fastening locking means of the structural connector during normal connection and disconnection of the transfer line to the carrier
Figure 4B:
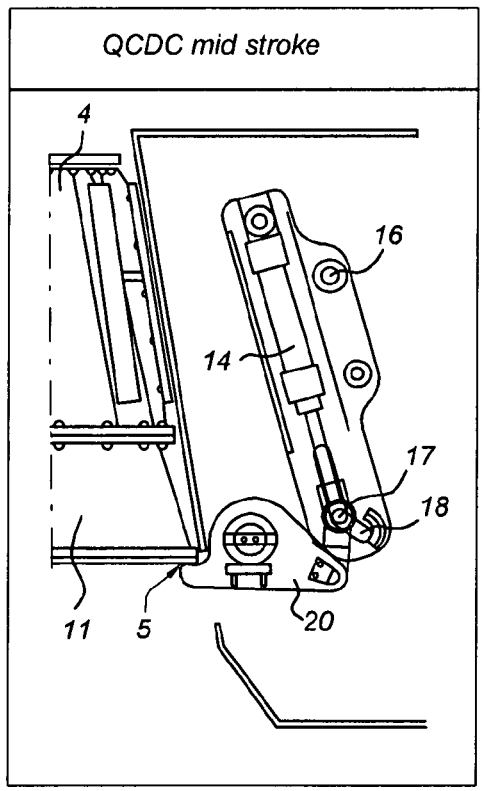
Figure 4C:
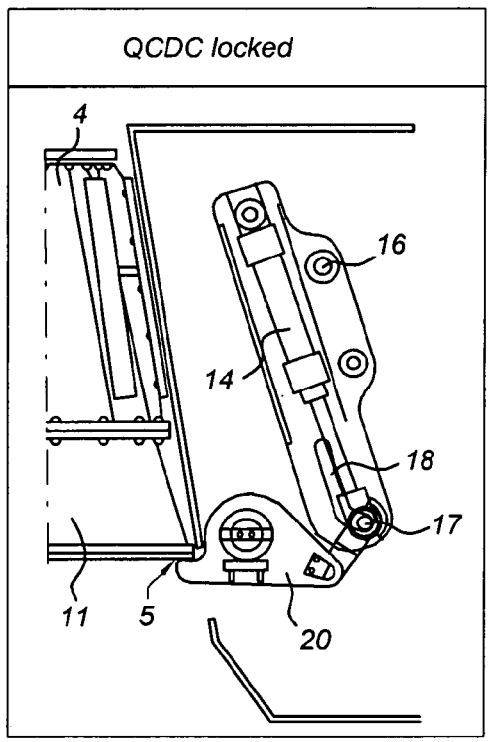

The structural connector's normal connection/disconnection system (QCDC) is mounted in a dedicated sub assembly. The QCDC subassembly is fixed between a bushing and the emergency disconnection system (ERS) cam system 15 which is normally locked in position. Inside this sub assembly, a QCDC hydraulic jack 14 is mounted on a hinge 16, which enables a slight rotation of the jack body while a rod 17 is sliding in a slot 18. This slot 18 allows to mechanically lock the system without power supply in the QCDC hydraulic jack 14. In FIG. 4a to 4c, it appears clearly that as the rod 17 is sliding down in the slot 18 the clamp's hook 20 is closing to secure the structural connector. In FIG. 4b the hook 20 is almost in position with regards to the loading transfer system 11, however the QCDC stroke is not complete. The stroke of the QCDC hydraulic jack 14 is that the rod 17 is sliding until it abuts against the bottom of the slot 18 as shown in FIG. 4c. The clamp is then considered locked.

Figure 5A:
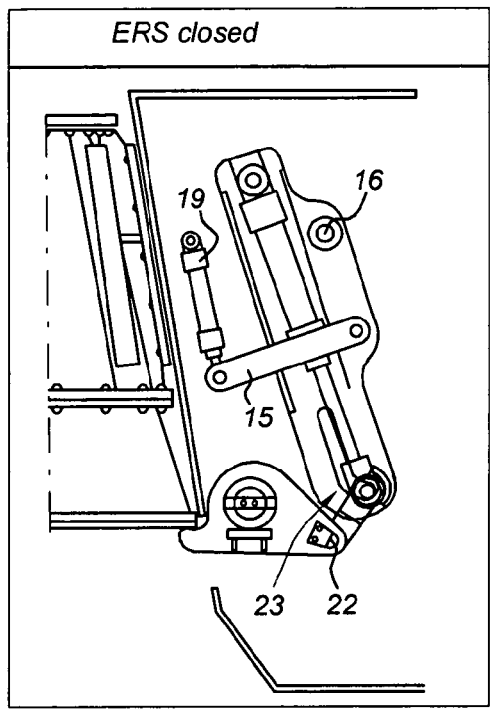
FIG. 5a to 5d show different views of the emergency disconnection of the structural connector according to the present invention.
Figure 5B:
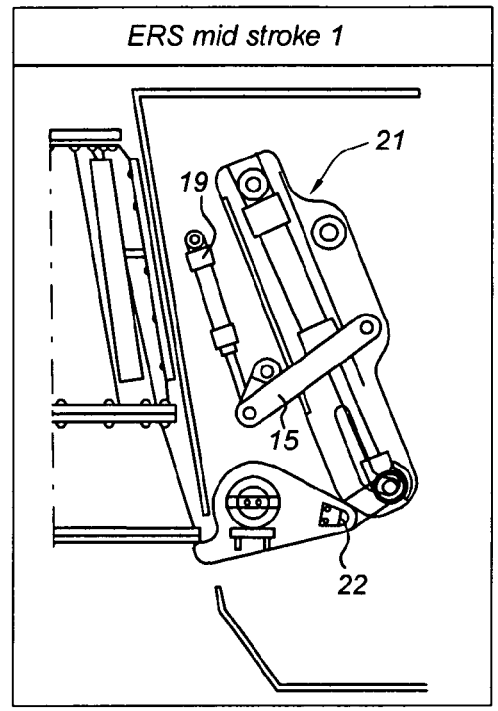
Figure 5C:
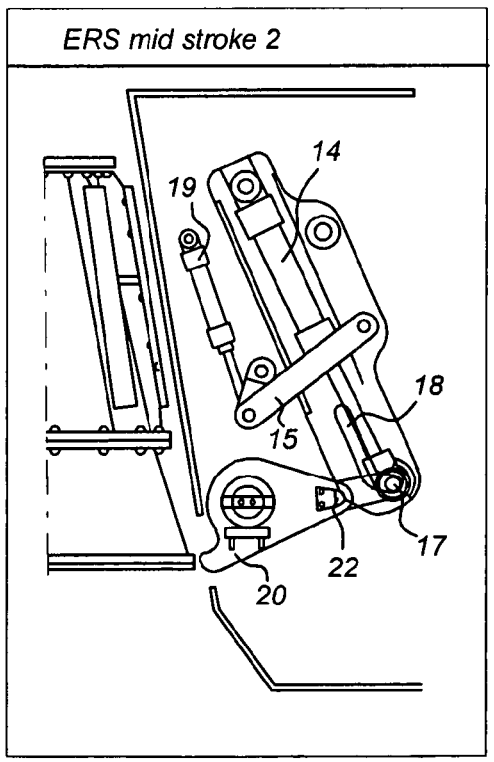
Figure 5D:
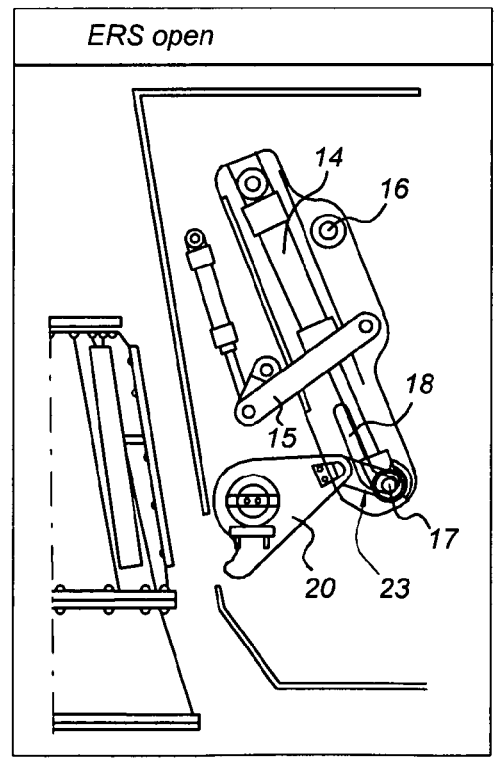

In FIGS. 5a to 5d the ERS jack 19 is shown. It is used to secure the QCDC subassembly in position in normal operation as shown in FIG. 5a. The ERS jack 19 stroke is used to act on the cam system 15 which results in the rotation of the whole QCDC subassembly around a hinge 16, which enables a slight rotation of whole QCDC subassembly 21.

Figure 6A:
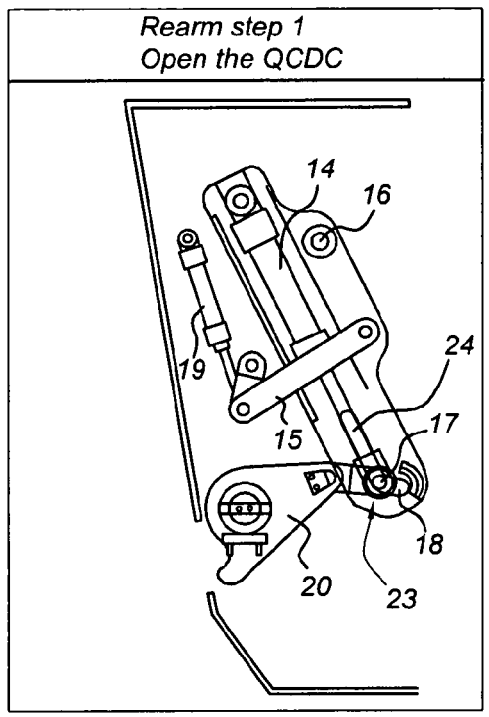
FIG. 6a to 6d show different views of the emergency disconnection means rearming process.

As the whole QCDC subassembly pivots while the QCDC hydraulic jack 14 stands still, the rod 17 still abuts against the bottom of the slot 18. However the pivoting junction 22 between the rod 17 and the hook 20 is taking all the loads (FIGS. 5*b* and 5*c*) until some point where the equilibrium is broken, the clamps' hook does no longer hold the system in position, the clamp's hook 20 is retracted (FIG. 5*d*) and the rod 17 leaves the end of the slot and stops where the slot 18 forms an angle at 23 (as shown in FIG. 6*a*).

Figure 6B:
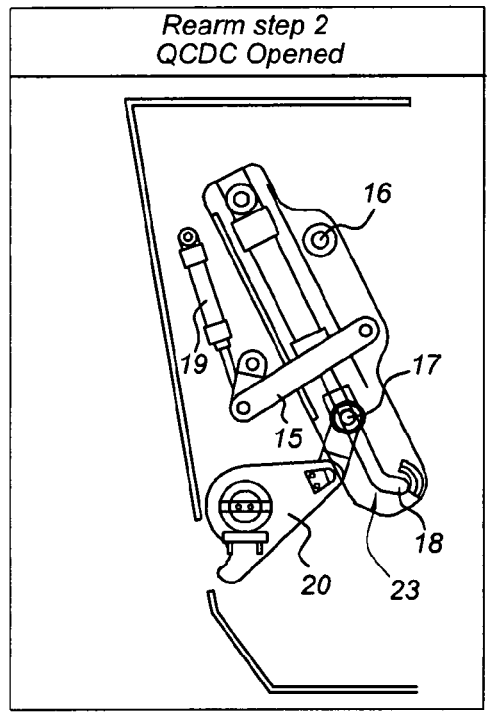
Figure 6C:
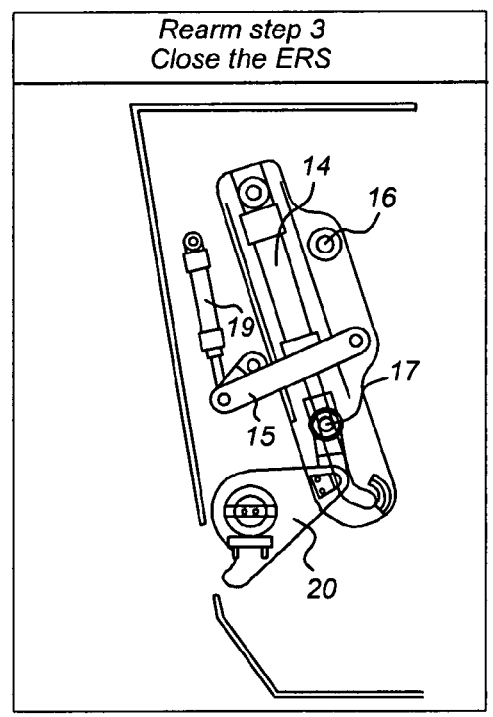
Figure 6D:
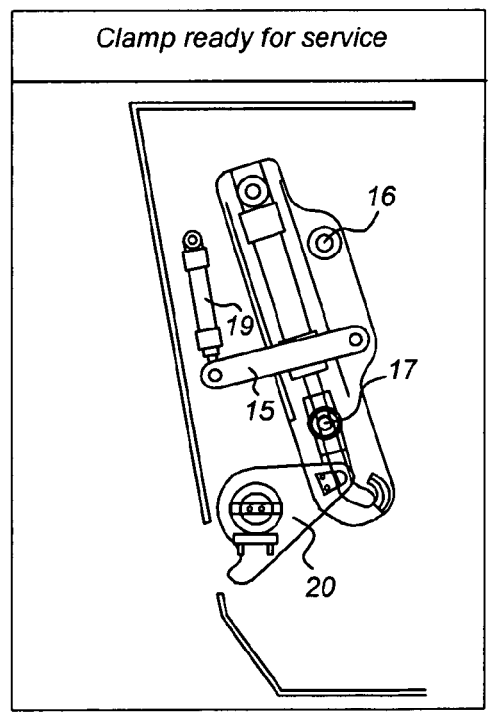

FIG. 6*a* to 6*d* show different views of the emergency disconnection means rearming process. According to the present invention the system is a disconnectable system that can be rearmed without external intervention. This is a major advantage as it proposes a complete reversible, reusable disconnectable system comprising normal connection/disconnection and emergency disconnection functions. By closing the QCDC hydraulic jack 14 system meaning the rod 17 is directed via the piston towards the top of the slot 18 at location 24 (FIG. 6*b*). The next step is to close the ERS by having the piston and rod assembly of the ERS hydraulic jack 19 retracting hence repositioning the cam system 15 in place (FIGS. 6*c* and 6*d*). The clamp 9 is then ready for service.

A secondary function of the structural connector is to provide physical protection for the fluid connector. It provides handling and lifting point during the connection phase.

It also provides buoyancy to the hose end during transit into the seawater thanks to the buoyancy modules 25 provided near the conical male structure (4, 11) as shown in FIGS. 2 and 3*a*.

Further, according to the present invention, the guiding system is a cone in cone. The structural connector (4, 11) has a conical shape at the end of the hose 2 and another cone shape in the carrier. The lifting winch (not shown) on the carrier is pulling to get the cone in the cone. This is an additional advantage of the present invention as there is no orientation required.

The position of the connector is controlled on the vertical axis (main symmetry axis) and on the horizontal plane. The vertical position is determined by the clamps 9*a*, 9*b* and 9*c*. An easily maintainable component fixed to the clamp is in contact with the transition piece 11 at location 5 hence considered as the transfer line end part assembly's fastening means. This component has a fine fabrication tolerance and is in contact between the clamp 9 and the transition piece 11. It can be changed in case wear is affecting the accuracy of the positioning.

The clamps vertical positions are fine tuned during a trial fit at the yard. Once the structural connector is mounted in connected position, the structural connector top flange location is measured and each discrepancy can be compensated by using custom made wedges on the vertical axis.

The strategy is the same on the horizontal plane with the radial stoppers. The adjustment is made with the screw and nut system at the top of the structural connector. The clamp is then slightly rotating around the pivot point on the main axis and the radial stoppers are driven to the required position.

The system, by its design, transmits loads from the export line 2 to the carrier hull through the structural connector 11, 4. The fluid connector main function is to transmit fluids but it can still have to take some loads as those generated by the structural connector deformation due to the export line loading, the construction tolerances which are positioning the connector at different location at each connection, the acceleration due to the ship motion or the thermal retraction of the piping lines when dealing with cryogenic fluids.

Therefore there is provided at the carrier bow an arrangement of a combination of three swivels in order to accommodate the displacements generated by the structural connector tolerances as shown in FIG. 7.

Figure 8:
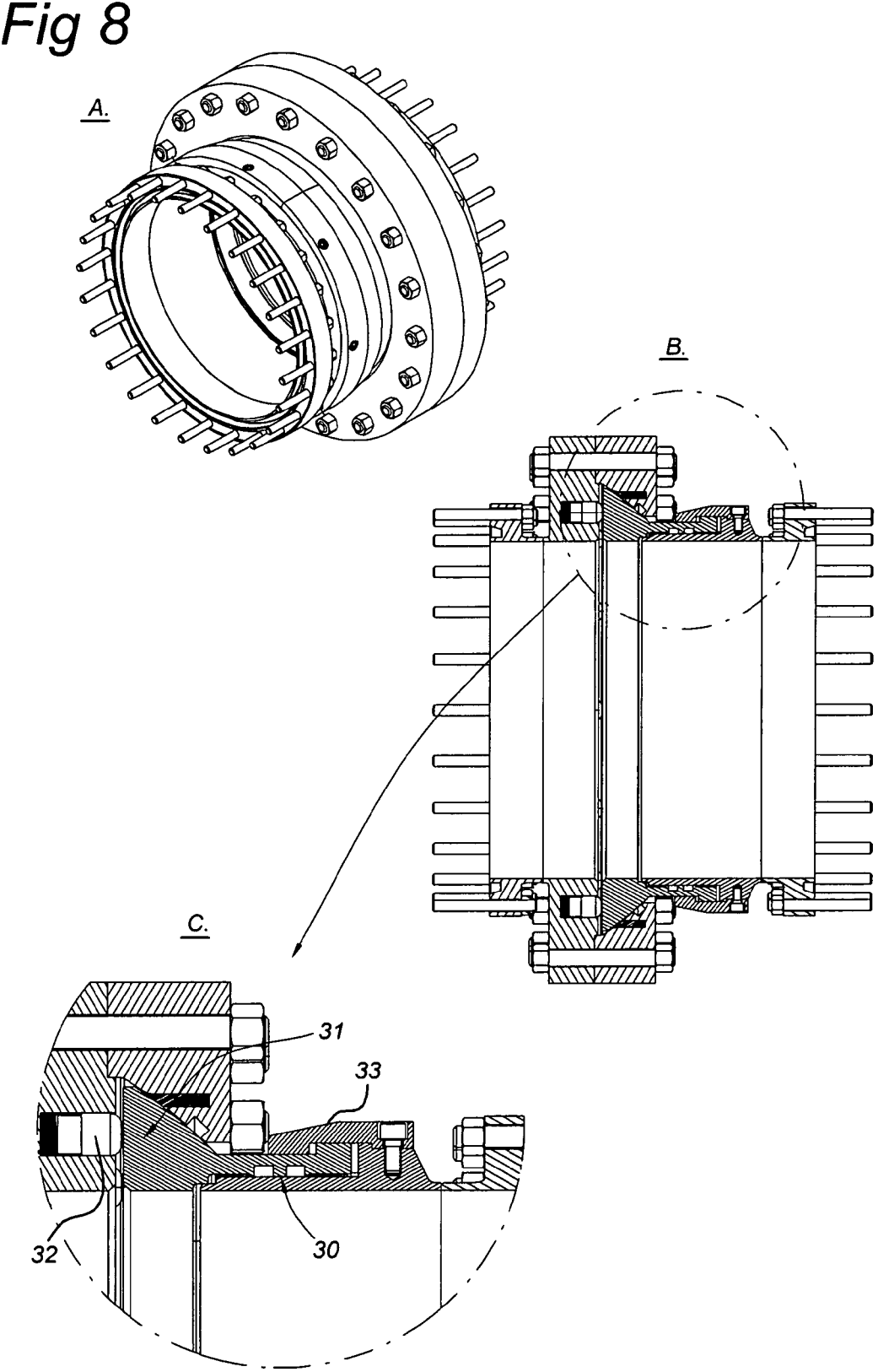
FIG. 8 shows a compliant spool piece designed to connect two piping components in a fluid transfer system according to the present invention.

This arrangement can be replaced by an alternative that is much more compact and lighter. The alternative solution according to the present invention is a compliant spool piece designed to connect two piping components in a fluid transfer system while providing loads decoupling characteristic. It is designed to absorb small misalignments (angular and axial) without generating unwanted reaction loads—i.e. this device avoids transferring any loads from one item to the other. As shown in FIG. 8, it uses proven design components such as piston seal system 30 for axial misalignment and a combined sphere and seat seal 31 for angular misalignment. The piston seal system 30 is used in standard piston seal swivel unit. Sphere and seat seal are implemented in standard ball valve system. A spring energized pusher 32 is used to keep the sphere in contact with the seat seal 31 when no fluid pressure is applied. Further, two—halve axial stoppers 33 are used to limit axial excursion.

The advantage of the arrangement lays in its ability to withstand higher pressure level with regards to bellows. Unlike metallic bellows, it is not affected by fatigue.

In FIGS. 9*a* to 9*d* the normal connection/disconnection of the transfer line to the carrier according to another embodiment of the present invention is shown. According to this embodiment, before initiating the connection, the ball valves are closed and the "merged" emergency and normal connection/disconnection means clamp support operating means (not shown) is opened at its maximum so that the clamp support 8 is fully open.

Figure 9A:
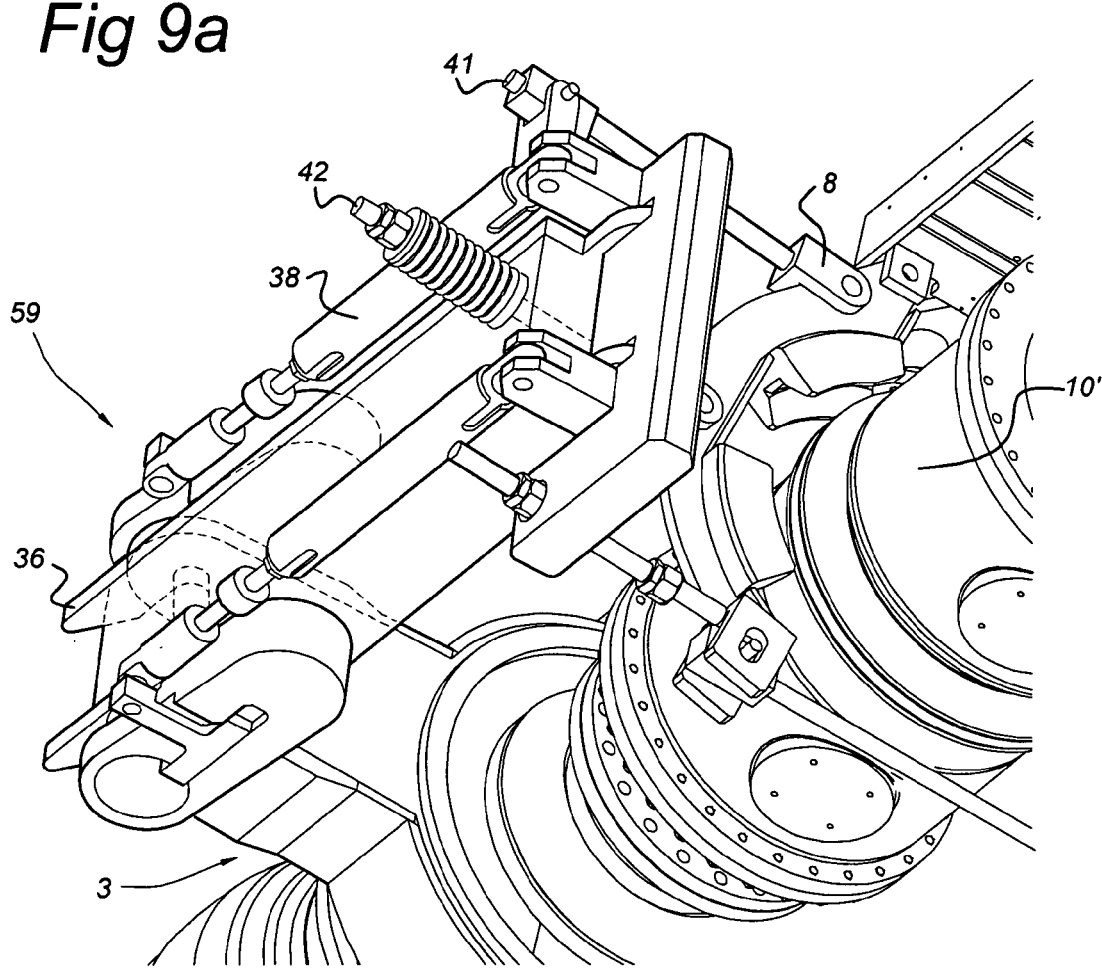
FIGS. 9a to 9d show the normal connection/disconnection of the transfer line to the carrier according to another embodiment of the present invention
Figure 9B:
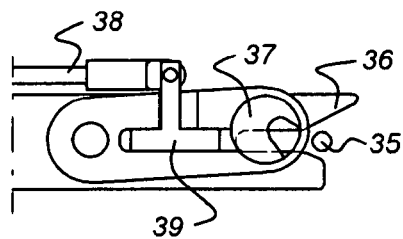
Figure 9C:
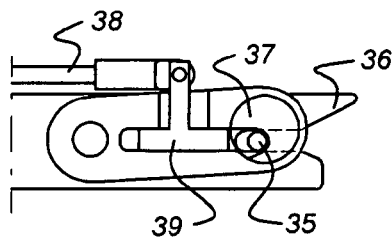
Figure 9D:
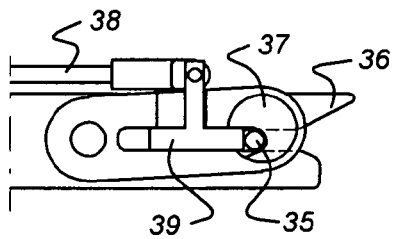
Figure 10A:
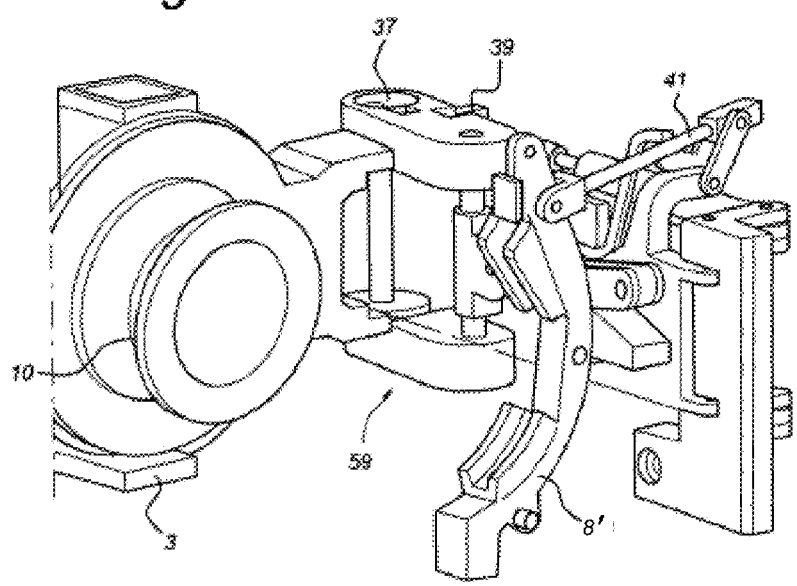
FIG. 10a to 10d show different views of the emergency disconnection of the connector according to the embodiment shown in FIGS. 9a to 9d.
Figure 10B:
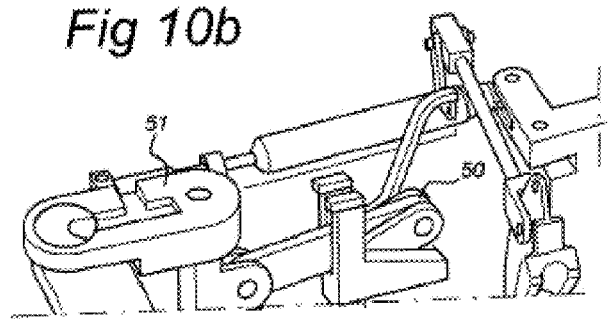
Figure 10C:
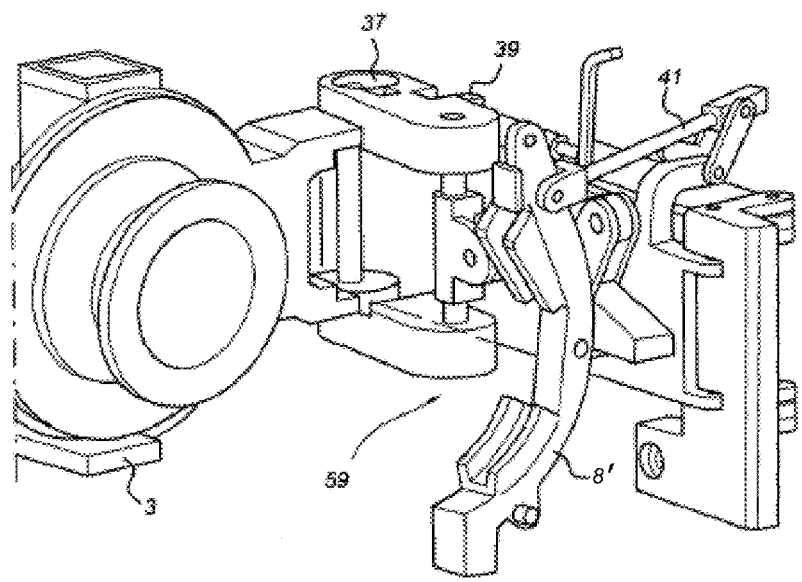
Figure 10D:
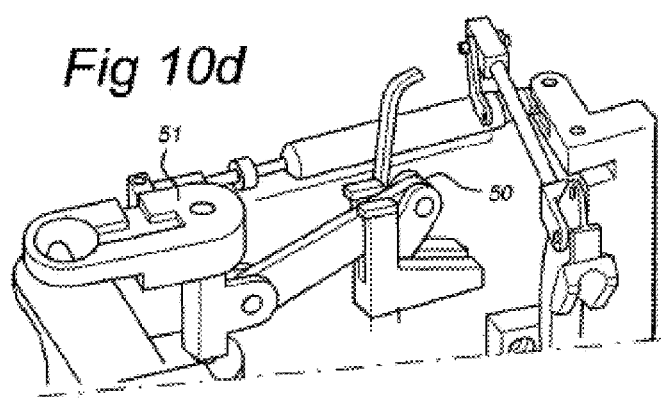

The transfer line end part assembly 3 of the connector is transferred from the FPSO stern to the carrier bow by means of the installation winch (not shown). At a given distance from the connection point on the carrier side, the guiding system ensures that the structural load diverter is properly aligned with its locking mechanism 37, 38, 39 as shown in FIG. 9*a*. The winch pushes the transfer line end part assembly 3 against the carrier part member 6. The rotating hooks 37 driven by the displacement of the connector pins 35, rotate about 120° (closed position) as shown in FIG. 9*b*. Enough pulling force has to be exerted by the winch to ensure that no gaps exist between the connector pins 35 and the pin receptacles 36. At that moment, the transfer line end part assembly 3 is immobilized thanks to the tension exerted by the winch. While the winch tension is maintained, the "merged" PERC/QCDC clamp support operating means, which is in the present embodiment a driving screw, is activated to close the clamp support. The "merged" PERC/QCDC clamp 8 pulls the lower tie rods. This action frees the load diverter normal connection/disconnection system locking mechanism 38. The spring energized locking mechanisms 38 rotate to their rest position as shown in FIG. 9*c*. This position engages the locking pins 39 on all four rotating hooks 37 as shown in FIG. 9*d*. The transfer line end part assembly 3 is now held in place by the rotating hooks 37 blocked in position by the locking pins 39.

However, the winch tension is still maintained as a back-up. At this time, the ball valve hubs 10, 10' are still free from the "merged" PERC/QCDC clamp support 8. The final stroke of the driving screw closes the "merged" PERC/QCDC clamp support 8 against the ball valve hubs 10, 10'. Adjustable nuts ensure that the structural load diverter normal connection/disconnection locking mechanisms are properly secured in their closed position when the driving screw reaches its final closed position. The winch shall be released before flushing, leak testing and fluid transfer. The transfer line end part assembly 3 shall be able to disconnect instantaneously in case of emergency. Flushing of the cavity between both ball valve spheres shall be conducted. Thereafter, opening of the double ball valve system can be authorized. Fluid transfer can start.

According to the present invention the normal disconnection in the embodiment shown operates with the same interaction between the load diverter locking mechanism 36, 37, 38, 39, the tie-rods 41, 42, 43 and "merged" PERC/QCDC clamp support 8 and the driving screw. When disconnecting the two connector assemblies 3, 6 in normal conditions, the LNG transfer shall stop and the double ball valves shall be closed. The trapped LNG in the cavity formed between the two spheres must be properly drained. The installation winch has to be re-connected and re-energized. The driving screw is activated to open the "merged" PERC/QCDC clamp support 8. The rotating hooks 37 are still closed but no longer secured (as shown in FIG. 9c).

When the hubs 10, 10' are completely free from the "merged" PERC/QCDC clamp support 8, nuts push open the load diverter locking mechanism 36, 37, 38, 39. This action disengages the locking pins 39 freeing the rotating hooks 37 as shown in FIG. 9a. Paying out the winch, releases transfer line end part assembly 3 of the connector. The hose end can be safely transferred back to the FPSO. The structural load diverter on the carrier side is ready for the next connection.

FIGS. 10a to 10d show different views of two different steps, in the emergency disconnection of the connector according to this embodiment of the present invention. For emergency disconnection, the "merged" emergency and normal connection/disconnection system activation means are energized, the "merged" PERC/QCDC clamp support 8' opening initiates the emergency disconnection of the structural load diverter. The transfer line end part assembly 3 of the connector is then disconnected. The "merged" PERC/QCDC clamp support 8' opens thanks to the intermediate tie rods 42 which are spring energized. The motion of the "merged" PERC/QCDC clamp support 8' will push the top tie rods 41. When the hubs 10, 10' are totally free from the "merged" PERC/QCDC clamp support 8', the nuts on the tie rods 41 trigger the structural load diverter emergency disconnection means 50. When activated, the structural load diverter emergency disconnection means 50 will release the rotating hooks 37 from the locking pins 39 and hence have the connector pins 35 free, the connector part assemblies 3, 6 are disconnected. The rotating hook supports 51 start moving with the connector pins 35 and the transfer line end part assembly 3 is released. The displacement of the rotating hook supports 21 automatically disengages the locking pins 39 freeing the rotation of the rotating hooks 37.

Figure 11:
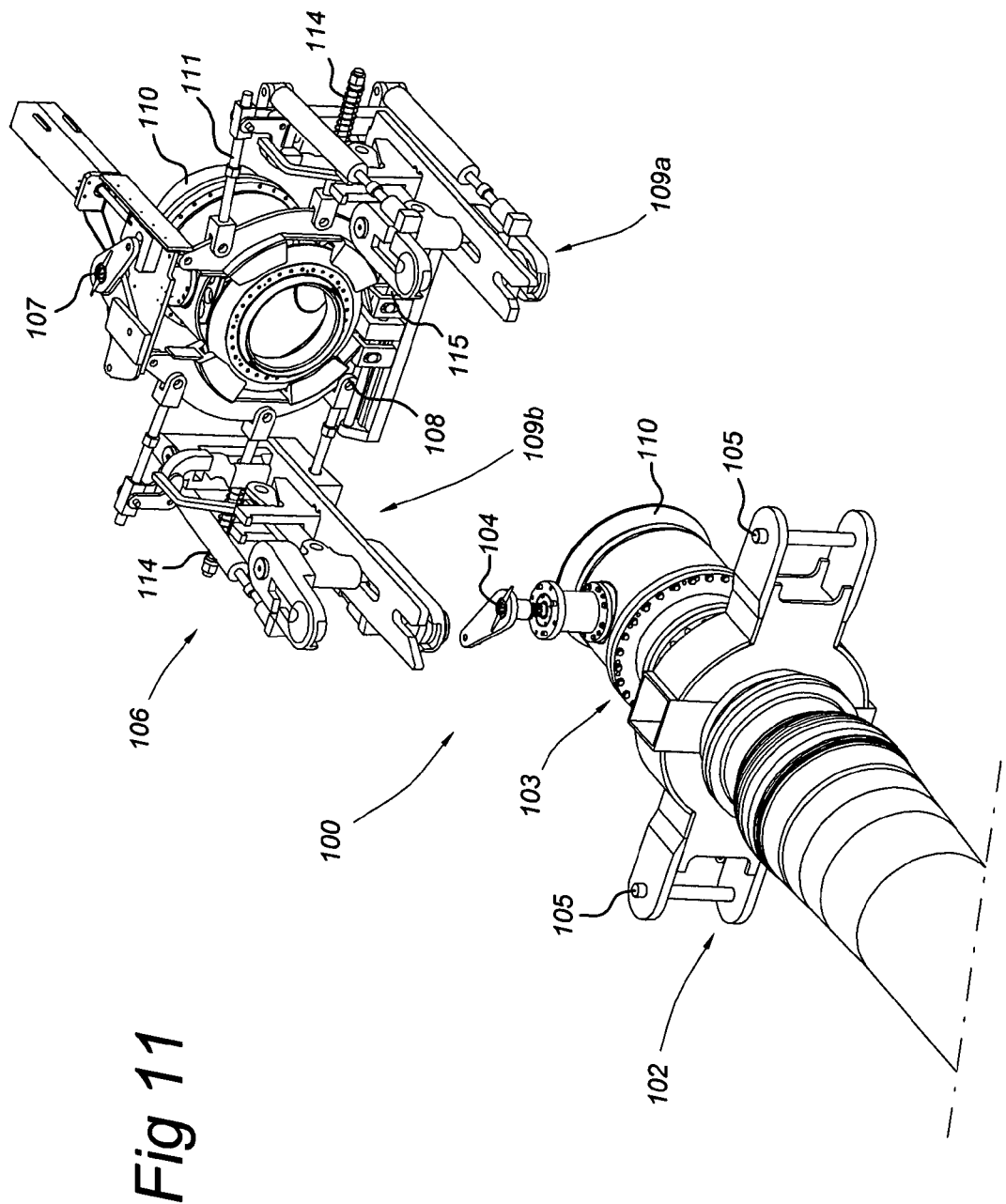
FIG. 11 shows another embodiment of the connector according to the present invention just before connection.

FIG. 11 shows one embodiment of the connector just before connection. According to the present invention, the connector 100 for releasably attaching a fluid transfer line 200 to a carrier comprising (a) first and second connector members 103,106, the first member or transfer line end part member 103 comprising a valve assembly 110, a valve actuating system 104 and fastening means 105, the second member or carrier part member 106 comprising a valve assembly 110', a valve actuating system 107, a merged Powered Emergency Release Coupler (PERC) and Quick Connect/Disconnect Coupler (QC/DC) clamp support 108 and a structural load diverter 109a, 109b.

Figure 12:
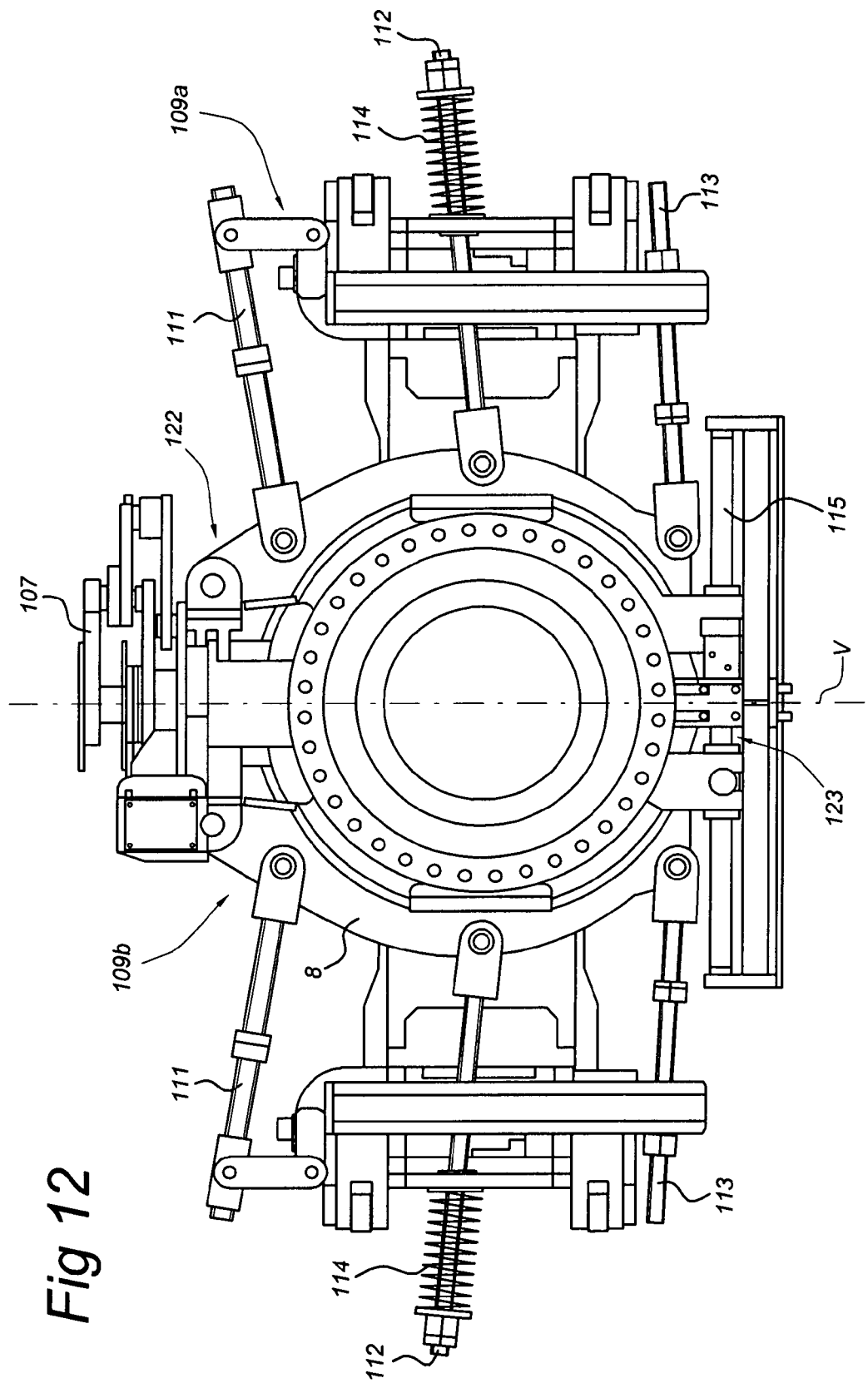
FIG. 12 shows a cross-sectional view of one embodiment of the connector according to the present invention.

In this particular embodiment, as better shown in FIG. 12, the part of the structural load diverter on the carrier part member (fixed part) is composed of two separate blocks 109a, 109b. These blocks are perfectly symmetrical with regards to the vertical plane (V) passing through the centre of the double ball valve system. Each block is connected to the merged PERC/QCDC via interlocks, which are in the present embodiment mechanical interlocks such as a set of three tie rods 111, 112, 113. The top tie rod 111 connects the structural load diverter block to the merged PERC/QCDC clamp support at the PERC location. The intermediate one 12 is equipped with linear spring 14 to energize the merged PERC/QCDC. The last one 113 connects the structural load diverter block to the merged PERC/QCDC near the driving screw of the QCDC system 115. The motion of the merged PERC/QCDC results in the displacements of one or more tie-rods 111, 112, 113 which in turn actuate the corresponding function on the structural load diverter side.

FIGS. 13a to 13d show detailed views of one embodiment of the fastening means and the locking means of the fastening means during normal connection/disconnection of the transfer line to the carrier.

According to the present invention, before initiating the connection, the ball valves are closed and the merged emergency and normal connection/disconnection means clamp support operating means 115 is opened at its maximum so that the clamp support 108 is fully open.

Figure 13A:
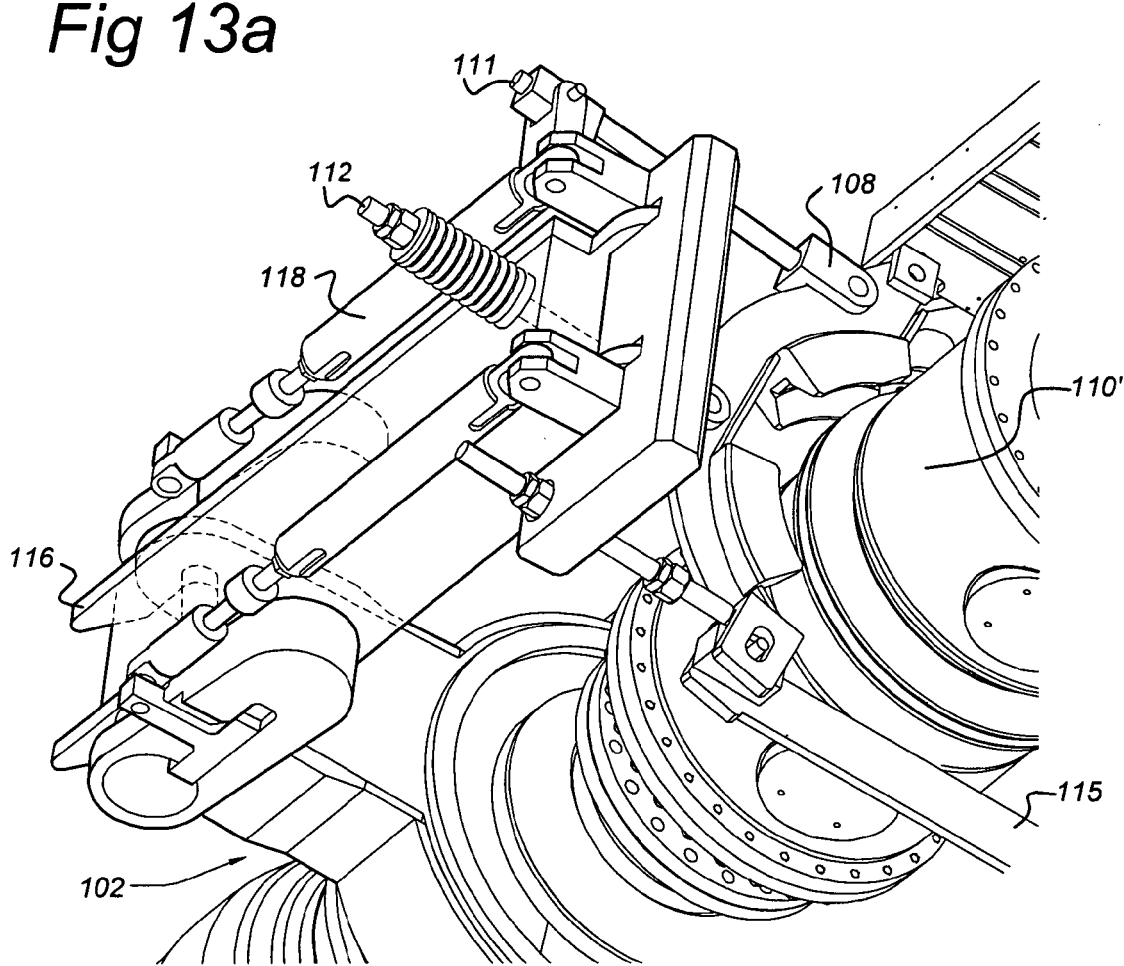
FIG. 13a to 13d show detailed views of one embodiment of the fastening and fastening locking means during normal connection and disconnection of the transfer line to the carrier.
Figure 13B:
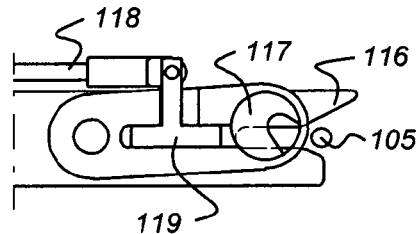
Figure 13C:
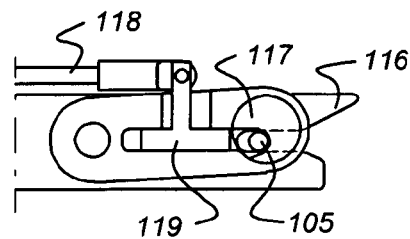
Figure 13D:
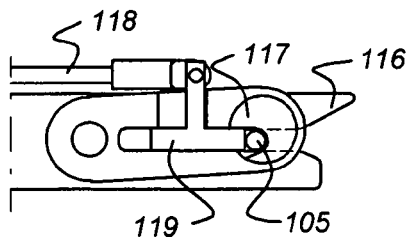
Figure 14A:
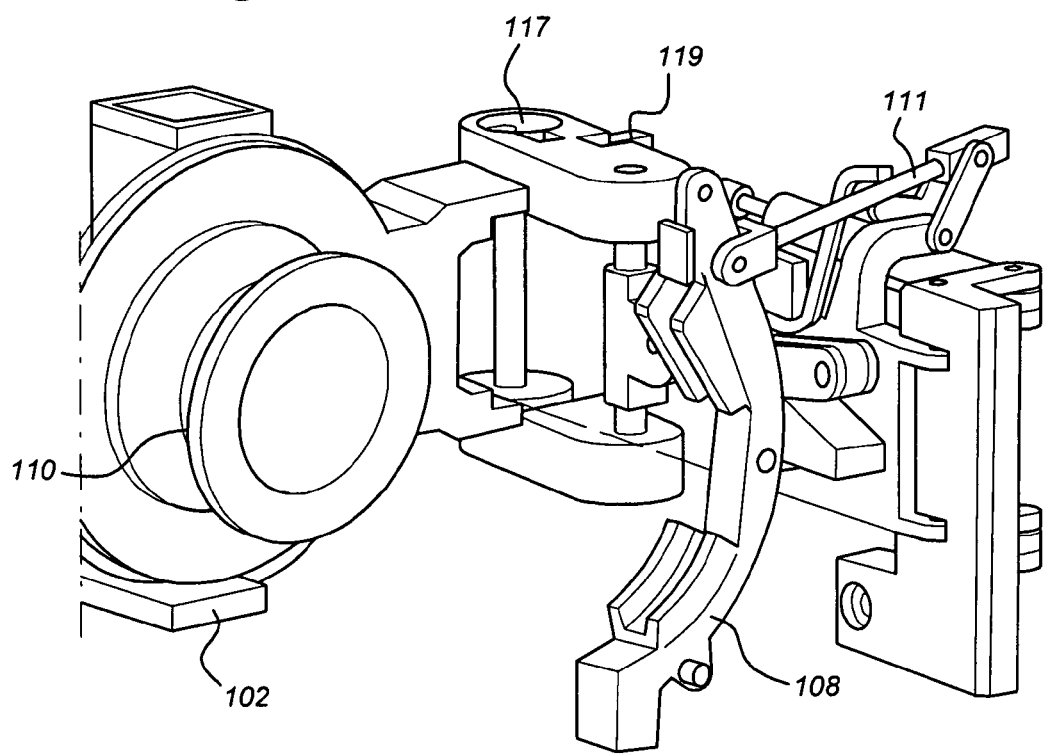
FIG. 14a to 14d show different views of two different steps, in the emergency disconnection of the connector according to the present invention.
Figure 14B:
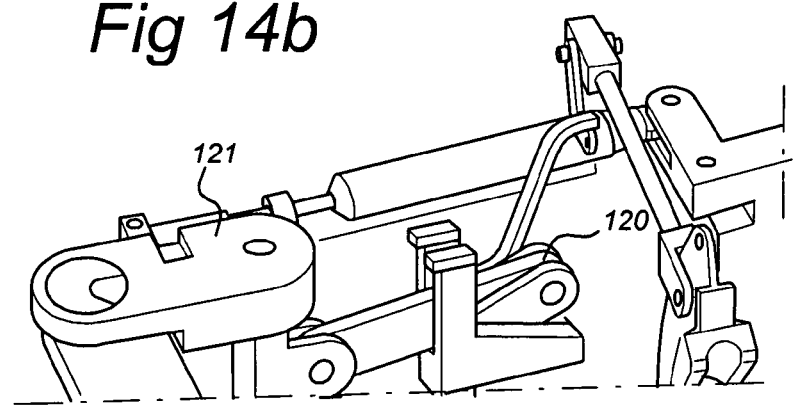
Figure 14C:
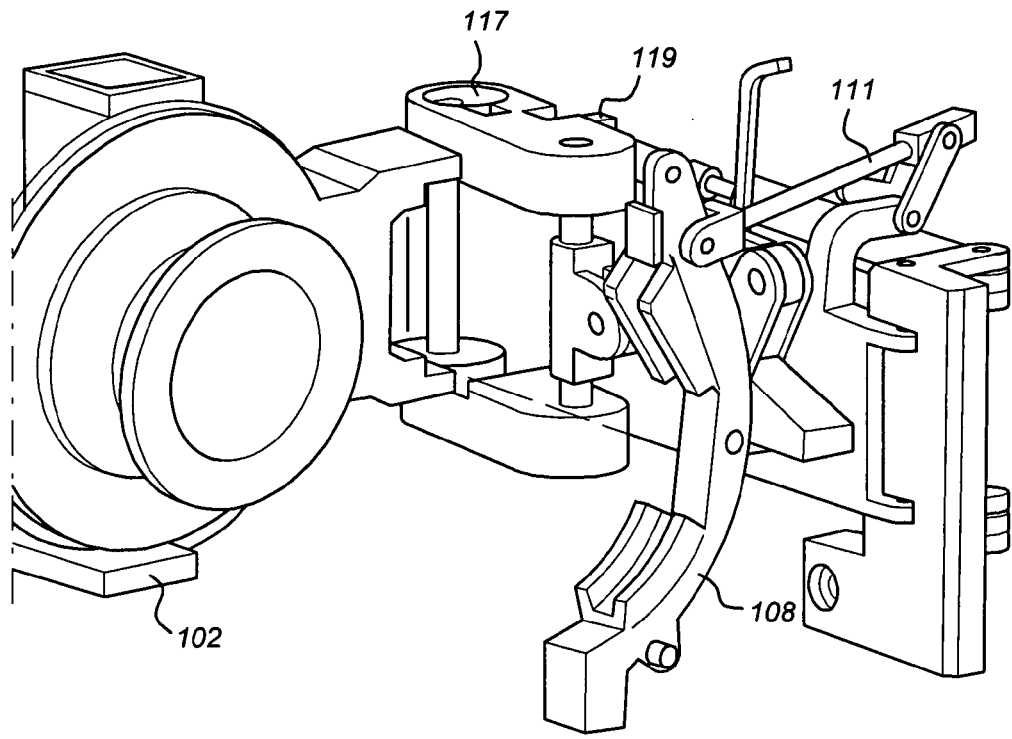
Figure 14D:
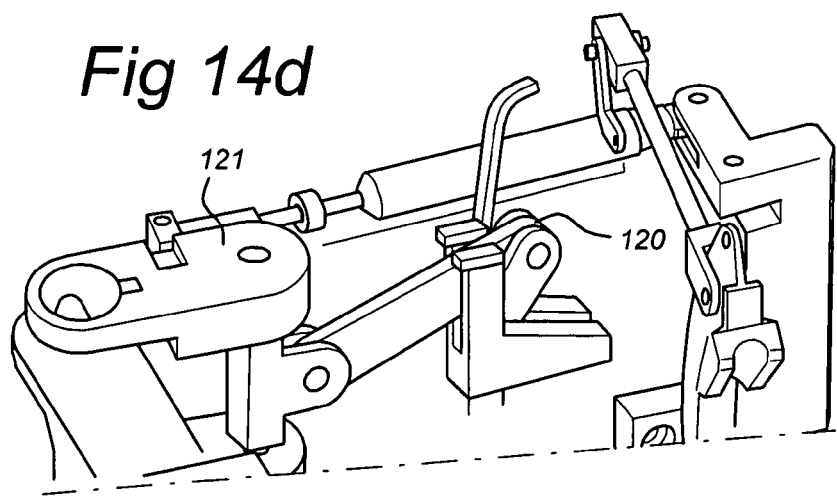

The transfer line end part member 102 of the connector is transferred from the FPSO stern to the LNGC bow by means of the installation winch (not shown). At a given distance from the connection point on the LNGC side, the guiding system ensures that the structural load diverter is properly aligned with its locking mechanism 117, 118, 119 as shown in FIG. 13a. The winch pushes the transfer line end part member 102 against the carrier part member 106. The rotating hooks 117 driven by the displacement of the connector pins 105, rotate about 120° (closed position) as shown in FIG. 13b. Enough pulling force has to be exerted by the winch to ensure that no gaps exist between the connector pins 105 and the pin receptacles 116. At that moment, the transfer line end part member 2 is immobilized thanks to the tension exerted by the winch. While the winch tension is maintained, the merged PERC/QCDC clamp support operating means, which is in the present embodiment a driving screw 115, is activated to close the clamp support. The merged PERC/QCDC clamp 108 pulls the lower tie rods 113. This action frees the load diverter normal connection/disconnection system locking mechanism 118. The spring energized locking mechanisms 118 rotate to their rest position as shown in FIG. 13c. This position engages the locking pins 119 on all 4 rotating hooks 117 as shown in FIG. 13d. The transfer line end part member 102 is now held in place by the rotating hooks 117 blocked in position by the locking pins 119.

However, the winch tension is still maintained as a back-up. At this time, the ball valve hubs 110, 110' are still free from the merged PERC/QCDC clamp support 108. The final stroke of the driving screw 115 closes the merged PERC/QCDC clamp support 108 against the ball valve hubs 110, 110'. Adjustable nuts ensure that the structural load diverter normal connection/disconnection locking mechanisms are properly secured in their closed position when the driving screw 115 reaches its final closed position. The winch shall be released before flushing, leak testing and LNG transfer. The transfer line end part member 102 shall be able to disconnect instantaneously in case of emergency. Flushing of the cavity between both ball valve spheres shall be conducted. Thereafter, opening of the double ball valve system can be authorized. LNG transfer can start.

According to the present invention the normal disconnection operates with the same interaction between the load diverter locking mechanism 116, 117, 118, 119, the tie-rods 111, 112, 113 and merged PERC/QCDC clamp support 108 and the driving screw 115. When disconnecting the two connector members 102, 106 in normal conditions, the LNG transfer shall stop and the double ball valves shall be closed. The trapped LNG in the cavity formed between the two spheres must be properly drained. The installation winch has to be re-connected and re-energized. The driving screw 115 is activated to open the merged PERC/QCDC clamp support 108. The rotating hooks 117 are still closed but no longer secured (as shown in FIG. 13*c*).

When the hubs 110, 110' are completely free from the merged PERC/QCDC clamp support 108, nuts push open the load diverter locking mechanism 116, 117, 118, 19. This action disengages the locking pins 119 freeing the rotating hooks 17 as shown in FIG. 13*a*.

Paying out the winch, releases transfer line end part member 102 of the connector. The hose end can be safely transferred back to the FPSO. The structural load diverter on the LNGC side is ready for the next connection.

FIGS. 14*a* to 14*d* show different views of two different steps, in the emergency disconnection of the connector according to the present invention.

As stated before, for emergency disconnection, the merged emergency and normal connection/disconnection system activation means 112 being energized, the merged PERC/QCDC clamp support 108 opening initiates the emergency disconnection of the structural load diverter. The transfer line end part of the connector 102 is then disconnected.

The merged PERC/QCDC clamp support 108 opens thanks to the intermediate tie rods 112 which are spring energized. The motion of the merged PERC/QCDC clamp support 108 will push the top tie rods 111. When the hubs 110, 110' are totally free from the merged PERC/QCDC clamp support 108, the nuts on the tie rods 111 trigger the structural load diverter emergency disconnection means 120. When activated, the structural load diverter emergency disconnection means 120 will release the rotating hooks 117 from the locking pins 119 and hence have the connector pins 105 free, the connectors parts 102,106 are disconnected. The rotating hook supports 121 start moving with the connector pins 105 and the releases transfer line end part member 102. The displacement of the rotating hook supports 121 automatically disengages the locking pins 119 freeing the rotation of the rotating hooks 117.

Other embodiments of a connector according to the invention comprise:

A connector wherein the activation of the normal connection/disconnection means of the flow connector activates the normal connection/disconnection means of the structural load diverter.

A connector, wherein the activation of the emergency disconnection means of the flow connector activates the emergency disconnection means of the structural load diverter.

A connector wherein the interlock synchronizing the structural load diverter operations with the flow connector operations is an interlock mechanically activated.

A connector wherein the interlock synchronizing the structural load diverter operations with the connector members operations is an interlock hydraulically activated.

A connector wherein the interlock synchronizing the structural load diverter operations with the connector members operations is operated by a computer.

A connector wherein the transfer line end part assembly is provided with buoyancy means.

A connector wherein the emergency disconnection system of the structural load diverter is reusable and can be tested in situ after connection of the connector assemblies.

A connector wherein the transfer line end part assembly comprises a containment draining system.

A connector wherein there is some buoyancy integrated within the containment draining system.

A connector for releasably attaching a LNG cryogenic transfer line to a LNG carrier manifold.

A connector wherein it is provided with an adjusting system accommodating displacements generated by the structural connector tolerances.

A connector wherein the adjusting system is a combination of three swivels.

A connector wherein the adjusting system is a compliant spool piece comprising components accommodating axial and angular misalignments.

Although particular embodiments of the invention have been described and illustrated herein, it is recognized that modifications and variations may readily occur to those skilled in the art, and consequently, it is intended that the claims be interpreted to cover such modifications and equivalents.

The invention claimed is:

1. A connector for releasably attaching two fluid transfer lines, the connector comprising:
   a fluid line connector assembly comprising
      a structural load diverter having a top structural part, and a lower structural load diverter; and
   a carrier connector assembly, comprising
      a clamp assembly having a subassembly rotatable around a first hinge point on a carrier via a first hydraulic cylinder connected to the subassembly, a hook being pivotally attached to the subassembly at a second hinge point, the hook being movable with respect to the subassembly via a second hydraulic cylinder that has one end attached to the subassembly and another end attached to the hook,
   each of the connector assemblies having a conical shape and having a fluid passage and a valve rotatably seated in the fluid passage for opening or closing off the fluid passage,
   wherein the second hinge point is movable in a slot on the subassembly upon actuation of the second hydraulic cylinder to a position at a bottom of the slot where the hook is placed in a locked clamping engagement with the lower structural load diverter.

2. The connector according to claim 1, wherein the first hydraulic cylinder is attached to the subassembly via a pivoting cam system such that upon actuation of the first hydraulic cylinder in a first direction, the cam system pivots the subassembly away from the lower structural load diverter and the hook is disengaged from the load diverter, and actuation of the first hydraulic cylinder in a second direction, while the hook is in an upward position in the slot, brings the hook into an engagement position by actuation of the second hydraulic cylinder.

\* \* \* \* \*